(12) United States Patent
Chang

(10) Patent No.: US 6,716,346 B1
(45) Date of Patent: Apr. 6, 2004

(54) FLUID MAGNETIZER

(76) Inventor: Hung-Cheng Chang, P.O. Box No. 6-57, Chung-Ho, Taipei 235 (TW)

( * ) Notice: Subject to any disclaimer, the term of this patent is extended or adjusted under 35 U.S.C. 154(b) by 0 days.

(21) Appl. No.: 10/330,626

(22) Filed: Dec. 30, 2002

(51) Int. Cl.7 .............................. B01D 35/06; C02F 1/48
(52) U.S. Cl. ..................... 210/222; 210/695; 123/538
(58) Field of Search .............................. 210/222, 223, 210/695; 123/538

(56) References Cited

U.S. PATENT DOCUMENTS

| | | | | |
|---|---|---|---|---|
| 4,289,621 A | * | 9/1981 | O'Meara, Jr. | 210/222 |
| 4,666,595 A | * | 5/1987 | Graham | 210/222 |
| 6,143,171 A | * | 11/2000 | Van Aarsen | 210/222 |
| 6,171,504 B1 | * | 1/2001 | Patterson | 210/222 |

* cited by examiner

*Primary Examiner*—David A Reifsnyder
(74) *Attorney, Agent, or Firm*—Troxell Law Office PLLC

(57) ABSTRACT

A fluid magnetizer having magnets that are arranged at the two sides of the route of the fluid. Two magnets are arranged on one side such that the N-pole of both magnets are faced toward each other and joined to form a N-magnetic packet, and two magnets are arranged at the other side such that the S-pole of both magnets are faced toward each other and joined to form a S-magnetic flux. Through the attraction caused by the opposite magnetism of the magnetic fluxes at the two sides, magnetic lines of forces having stronger strengths are generated and then linearly penetrated through the section of the fluid. Therefore, the fluid is fully magnetized when passing through the magnetizing segment, thereby increasing the magnetization efficiency of the fluid.

8 Claims, 9 Drawing Sheets

FLUID MAGNETIZER

BACKGROUND OF THE INVENTION (a) Field of the Invention

The invention relates to a fluid magnetizer, and more particularly, to a fluid magnetizing device for optimizing magnetization efficiency of fluids.

(b) Description of the Related Art

Industrial water treatment and related industrialists add magnetizing devices onto pipelines for magnetizing fluids passing through in order to change properties of the fluids thereby increasing heat exchange efficiency, preventing pipelines from corrosion, elevating engine power, or altering timings for chemical reactions resulted from mixing chemicals.

As it should be, the higher the magnetization efficiency that the aforesaid fluids passing through the magnetizing device receive, the better the results one gets. Apart from the intensity of magnetizing forces provided by magnetizers in magnetizing devices, the diameter of pipelines thereof also has a most direct influence on the magnetization efficiency.

Quite a number of fluid magnetizers are being currently used, which shall be described hereunder.

Referring to FIG. 1 showing a current fluid magnetizer, two semicircular arcuated magnets 10 are clamped by a clamp 20 to be fixed on a pipeline 30. The magnetic lines of forces of the magnets 10 are then penetrated through into the pipeline 30 to magnetize the fluid therein.

Referring to FIG. 2 showing a current fluid magnetizer, more than two magnets 10 with the same pole arranged next to each other are inserted into a U-shaped holder 21, and the magnetic force thereof is employed to have the magnets 10 attached to the pipeline 30. The magnetic lines of forces of the magnets 10 are similarly penetrated into the pipeline 30 to magnetize the fluid therein.

Referring to FIG. 3 showing a current fluid magnetizer, a plurality of magnets 10 are piled for composing a magnetic cluster, which is then arranged on the outer wall of the pipeline 30. A frame 22 is provided for fixing the corresponding positions in the magnet cluster, such that the magnetic lines of forces are arranged in order in the pipeline 30.

Referring to FIGS. 4 and 5 showing a structure disclosed in the U.S. Pat. No. 6,143,171, the magnets 10 are axially arranged in the center of the pipeline 30 using the frame 22, so that magnetic lines of forces of neighboring magnets 10 are generated within the pipeline 30.

In the several fluid magnetizers described above, the magnetic lines of forces thereof only distribute on the peripheries of the magnets, meaning that they are tangential to the route of the fluids thereof and are unable to perpendicularly penetrate the pipelines. Therefore the magnetic lines of forces distributed at farther areas to the magnetic bodies within the pipelines are comparatively scarce, almost approaching zero. For the reason that arrangements of such magnets cause the magnetic lines of forces to be tangent to the route of the fluids thereof, the magnetization efficiency somewhat remains limited even if magnets having stronger magnetic forces are used. Moreover, due to structural restraints of conventional magnetizers, volumes of magnets and sectional areas at pipelines thereof are also restricted with respect to proportion.

SUMMARY OF THE INVENTION

The object of the invention is to provide a fluid magnetizer, wherein magnets are arranged at the opposite sides of the diameter of the route of the fluid thereof. At one side thereof, two magnets are arranged such that the N-pole of both magnets are faced to each other and joined to form a N-magnetic flux. At the other side thereof, two magnets are arranged such that the S-pole of both magnets are faced to each other and joined to form a S-magnetic flux. Through the attraction caused by the opposite magnetism of the magnetic fluxes at the two sides, magnetic lines of forces having stronger strengths be generated and then linearly penetrated through the section of the fluid thereof. Therefore, the fluid thereof is fully magnetized when passing through the magnetizing segment, thereby increasing the magnetization efficiency of the fluid thereof

DESCRIPTION OF THE PREFERRED EMBODIMENTS

To better understand the invention, other objects and detailed structural descriptions shall be illustrated with the accompanying drawings below.

Figure 1:
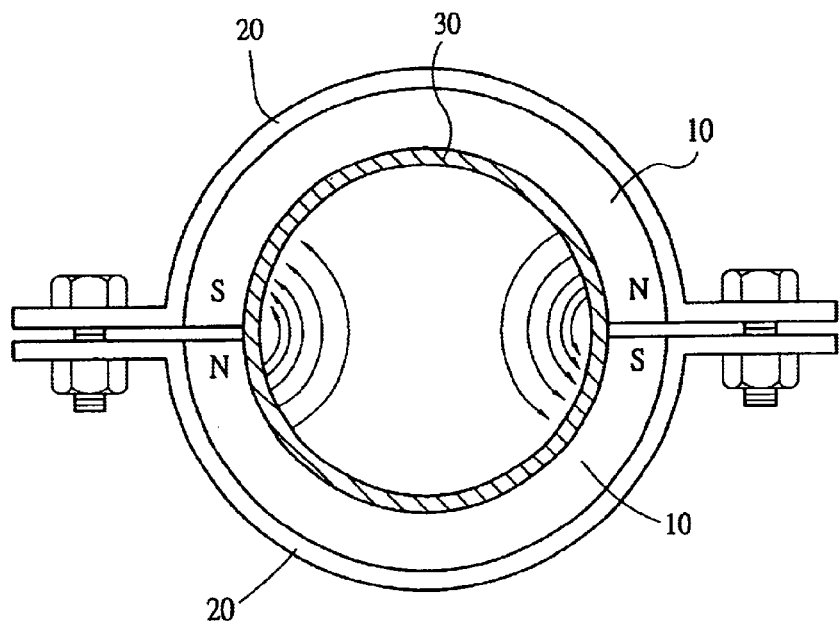
FIG. 1 is a planar schematic view showing a conventional fluid magnetizer.
Figure 2:
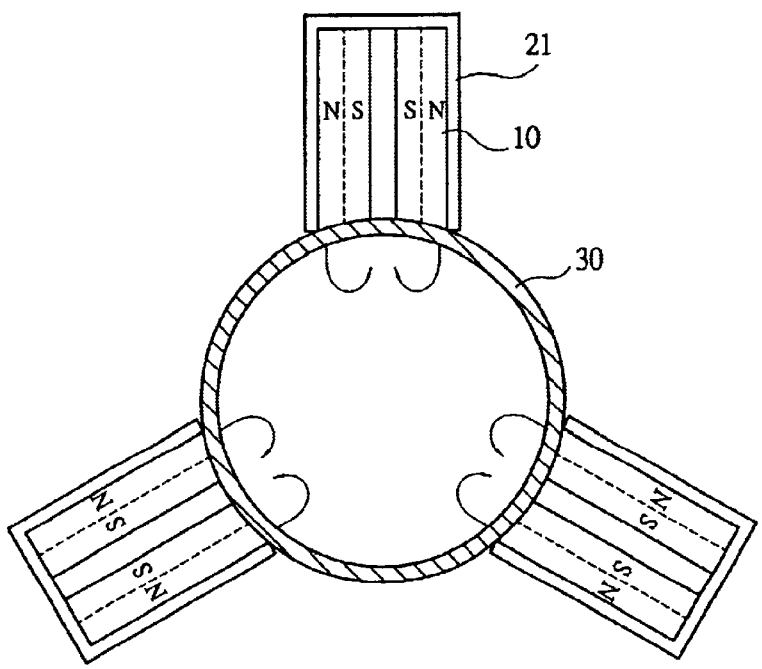
FIG. 2 is a planar schematic view showing another conventional fluid magnetizer.
Figure 3:
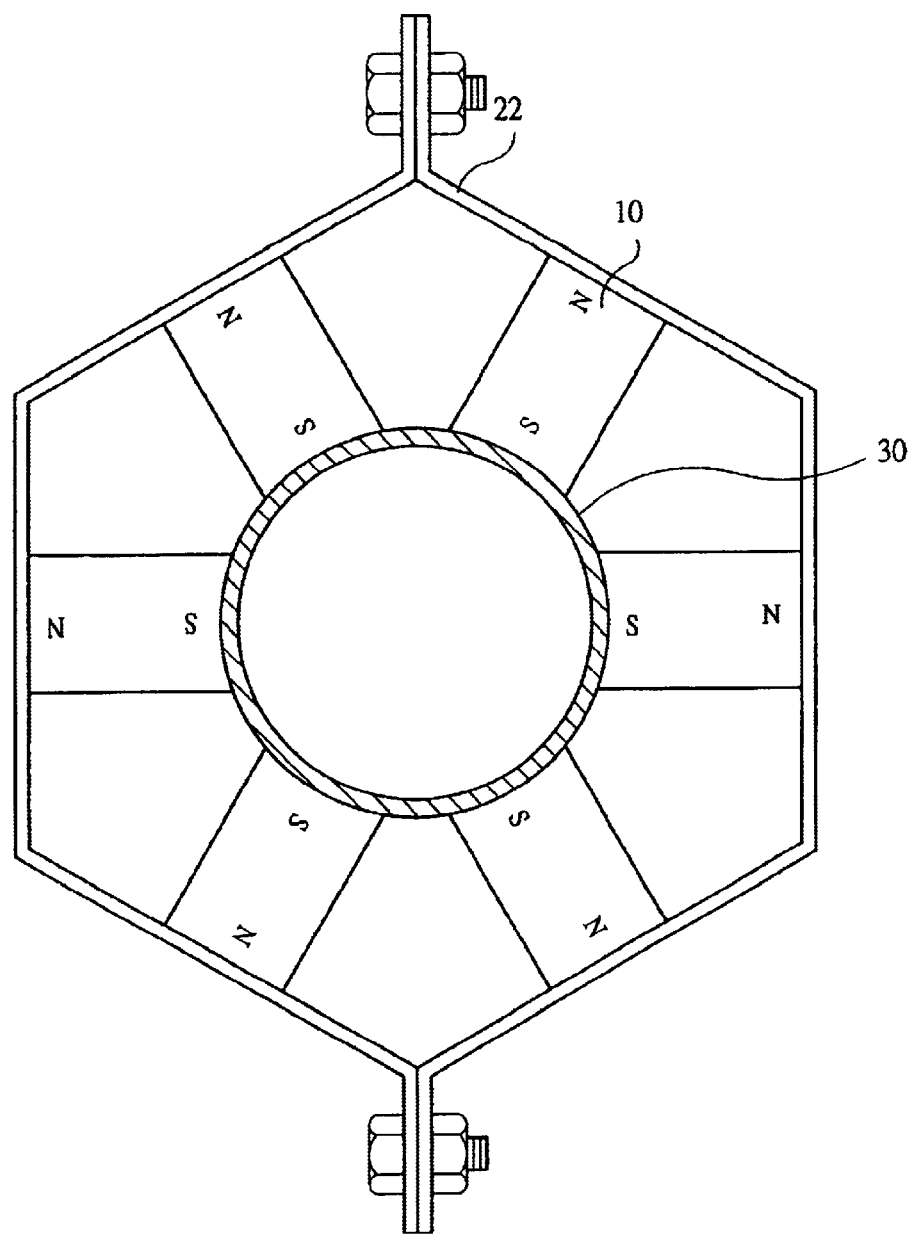
FIG. 3 is a planar schematic view showing another conventional fluid magnetizer.
Figure 4:
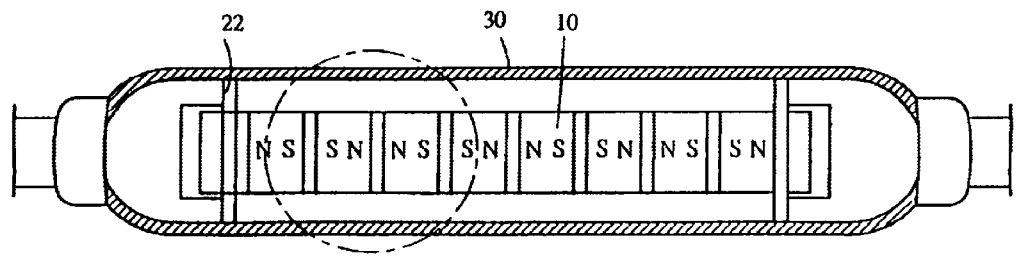
FIG. 4 is a schematic view showing the structure disclosed by the U.S. Pat. No. 6,143,171.
Figure 5:
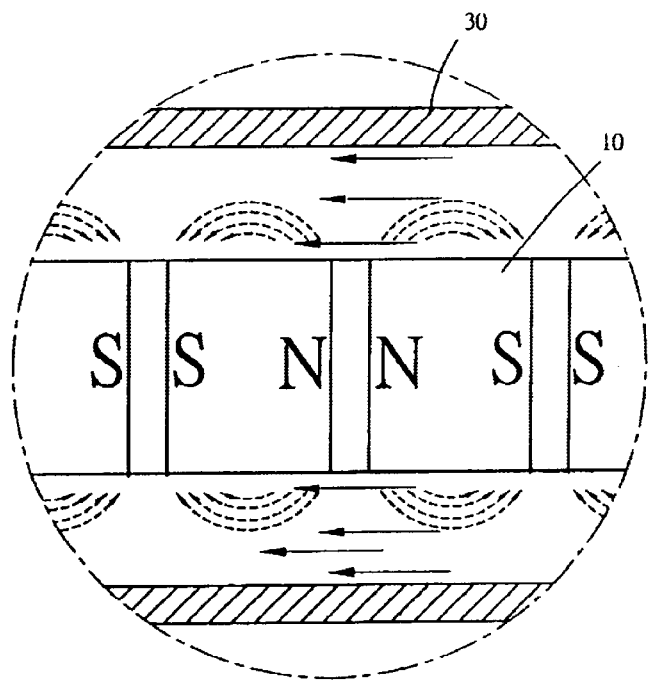
FIG. 5 shows the distribution of magnetic lines of forces of the structure disclosed by the U.S. Pat. No. 6,143,171.
Figure 6:
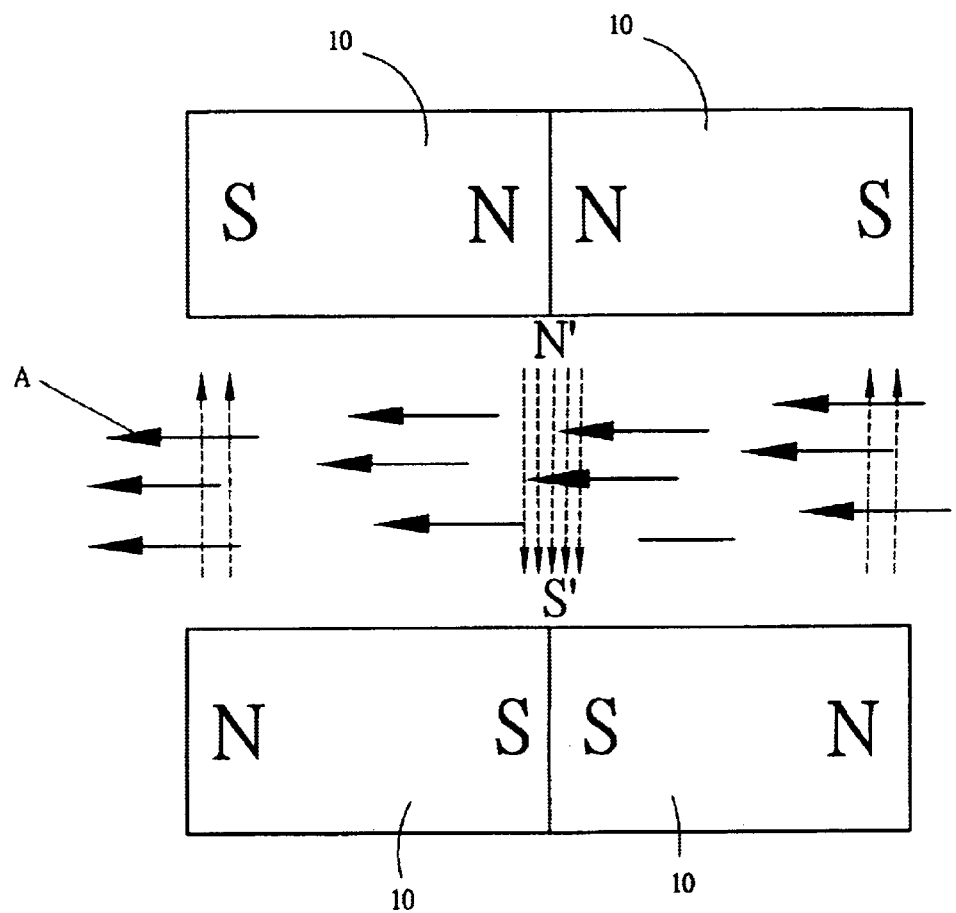
FIG. 6 is a schematic view showing the principle in accordance with the invention.

Referring to FIG. 6, in the fluid magnetizer in accordance with the invention, magnets 10 are arranged at the two sides of a route A of a fluid. At one side thereof, two magnets are arranged such that the N-pole of both magnets are faced to each other and joined to form a N-magnetic flux N'. At the other side thereof, two magnets are arranged such that the S-pole of both magnets are faced to each other and joined to form a S-magnetic flux S'. Through the attraction caused by the opposite magnetism of the magnetic fluxes at the two sides, magnetic lines of forces having stronger strengths be generated and then linearly penetrated through the section of the fluid thereof. Therefore, the fluid thereof is fully magnetized when passing through the magnetizing segment, thereby increasing the magnetization efficiency of the fluid thereof.

Referring to FIG. 6, the N-magnetic flux N' and the S-magnetic flux S' are respectively formed by joining two magnet surfaces of the same pole that repel each other, and therefore because that the two magnetic fluxes having opposite magnetisms are situated at the two sides of the route A of the fluid, the magnetic lines of forces having high densities be generated by the two magnetic fluxes and then penetrated through the route A of the fluid, thereby increasing the magnetization efficiency of the fluid thereof.

Figure 7:
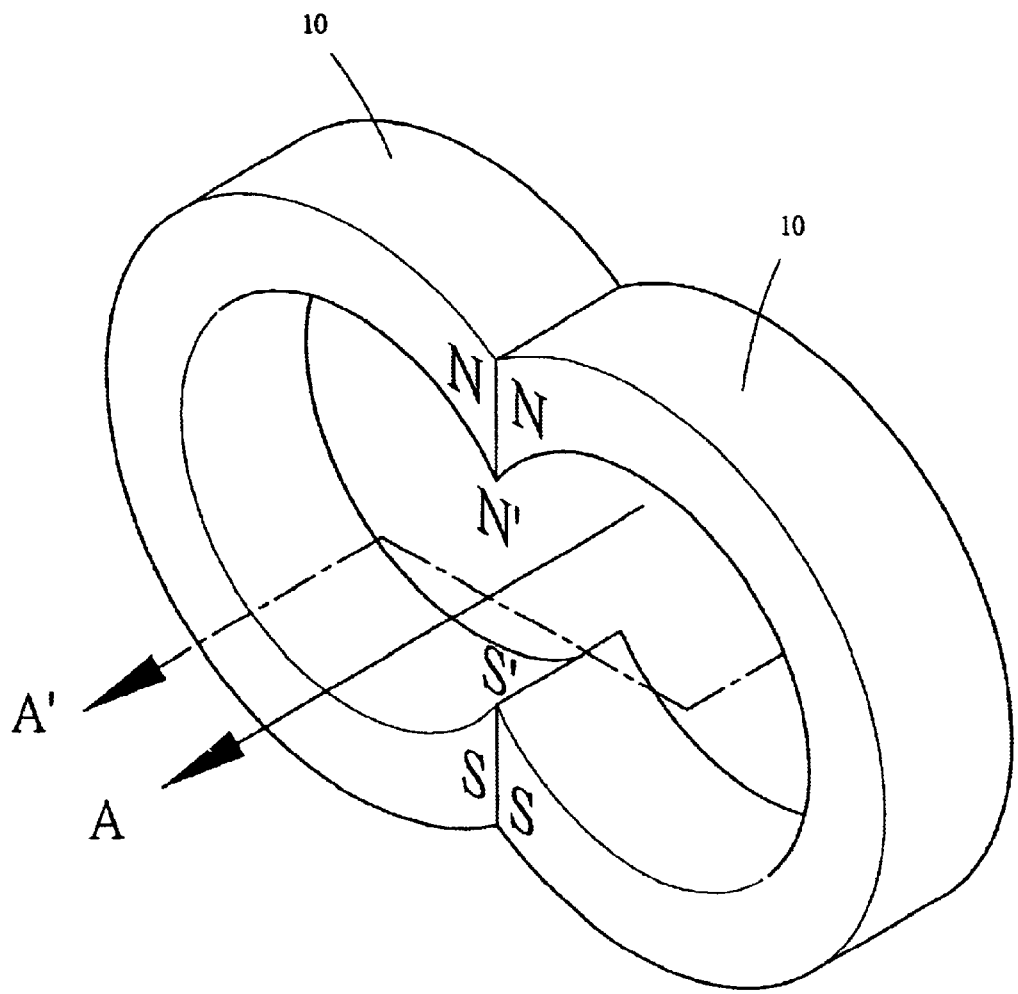
FIG. 7 is a schematic view showing the first embodiment in accordance with the invention.

Referring to FIG. 7 showing a first embodiment according to the invention, two C-shaped magnets 10 facing each other are joined and provided on the flowing route of the fluid thereof. The same poles of the magnets 10 are situated next to each other to generate two magnetic fluxes N' and S' of different magnetic poles. The two magnetic fluxes N' and S' produce magnetic lines of forces that perpendicularly penetrate the route A or A' of the fluid thereof, and the strength of the magnetic lines of forces penetrating through the route of the fluid thereof is inversely proportional to the distance between the opposite poles at the two sides. As a result, in order to obtain the best magnetization efficiency, the distance between the magnetic poles N and S at the terminals of the C-shaped magnets 10 has to be less than the inner diameter of the C-shaped magnets 10.

Figure 8:
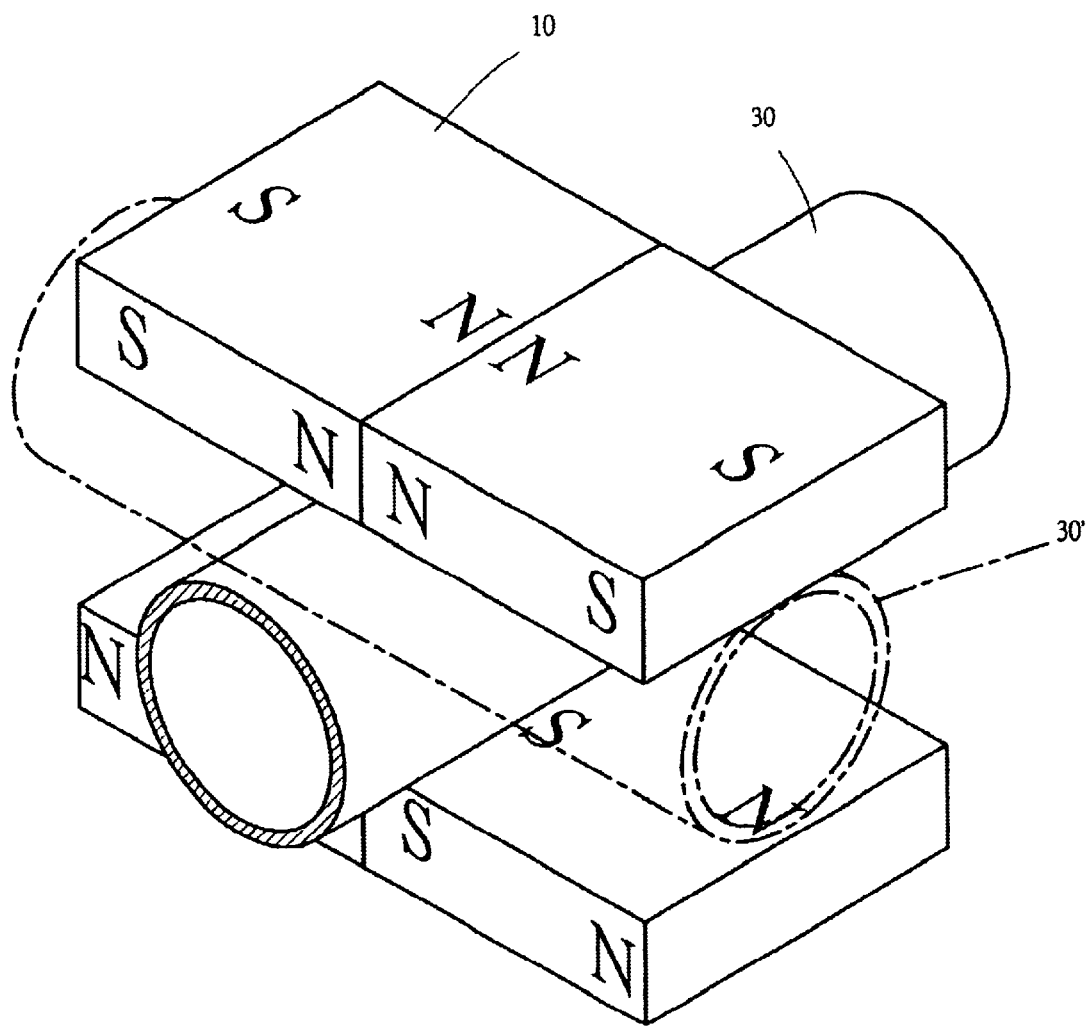
FIG. 8 is a schematic view showing the second embodiment in accordance with the invention.

Referring to FIG. 8 showing an implementation according to the invention, the pipeline 30 is used to control the flowing route of the fluid thereof. The relative angle in the arrangement of the pipelines 30 and 30' and the magnets 10 is not necessarily restricted as long as the N-magnetic flux N' and the S-magnetic flux S' formed between the magnets 10 are situated at the two sides of the pipeline 30, such that the magnetic lines of forces generated between the two magnetic fluxes N' and S' are perpendicularly penetrated through the pipeline 30 to the flowing route of the fluid thereof.

Figure 9:
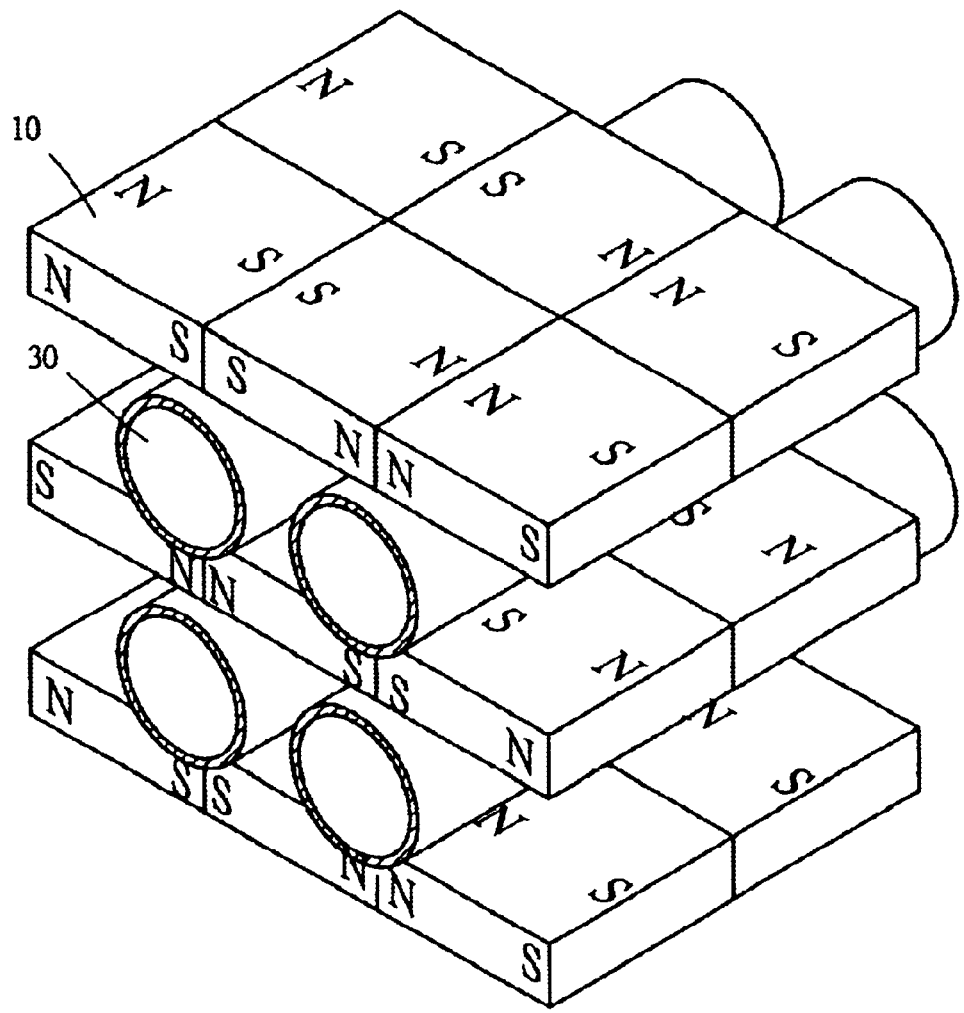
FIG. 9 is a schematic view showing the third embodiment in accordance with the invention.

Referring to FIG. 9 showing the invention being applied to a plurality of pipelines 30, the magnets 10 are arranged in order at the two sides of each of the pipelines 30. The N-magnetic fluxes N' and S-magnetic fluxes S' are generated between the arranged magnets 10, arrays, such that the magnetic lines of forces of the magnetic fluxes N' and magnetic fluxes S' penetrate respective pipelines 30. The structure thereof may be applied for simultaneous magnetization of different fluids.

Figure 10:
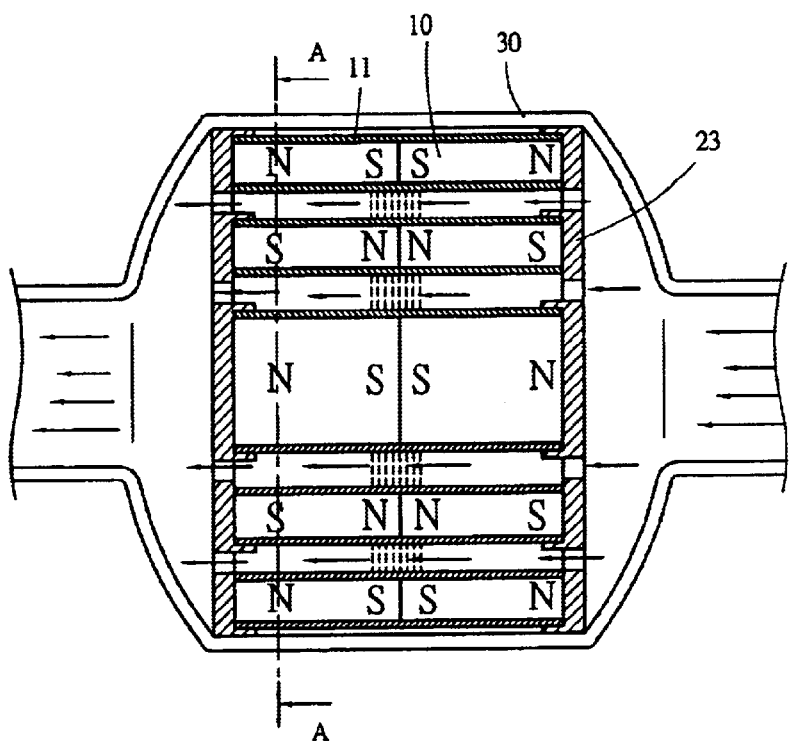
FIG. 10 is a schematic view showing the fourth embodiment in accordance with the invention.
Figure 11:
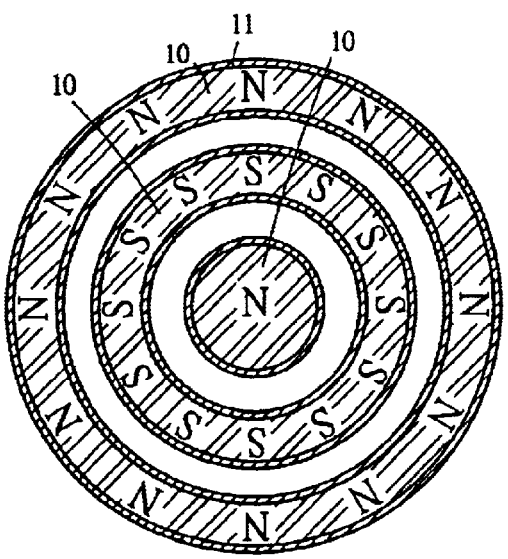
FIG. 11 is a cross-sectional view taken along line A–A' of FIG. 10.

Also, referring to FIGS. 10 and 11, according to the invention, a fixator 23 is adopted to fix a plurality of circular magnets 10 of different diameters in a concentric manner; not only the relative positions between respective magnets 10 are fixed, an appropriate distance between respective magnets 10 is also maintained as passageways for the fluid thereof to pass through. It is without doubt that the corresponding N and S poles of the neighboring magnets 10 have to be adjacent (as shown in FIG. 10) to form the N-magnetic flux N' and S-magnetic flux S'. The magnetic poles of the magnets 10 at the two sides of respective passageways also have to be opposite (as shown in FIG. 11) so that the magnetic fluxes N' and S' generated by respective magnets situated at the opposite sides of the passageways, due to the magnetic lines of forces produced by attraction, are linearly penetrated through the passageways and are also perpendicular to the route of the fluid thereof. Hence, each unit of the fluid thereof passing between the magnets 10 may travel through the magnetic lines of forces for magnetizing. In addition, to prevent oxidization and any resulting damages due to direct contact of the magnets 10 and the fluid thereof, a cover layer 11 may also be provided on the surface of the magnets 10. In the magnetizer described above, the distance between the two corresponding magnetic fluxes N' and S' is reduced using the concentric arrangement, and so the density of the magnetic lines of forces at a particular segment is higher as well as having a stronger strength, thereby obtaining an optimum magnetization efficiency when the fluid thereof passes through the particular segment.

Figure 12:
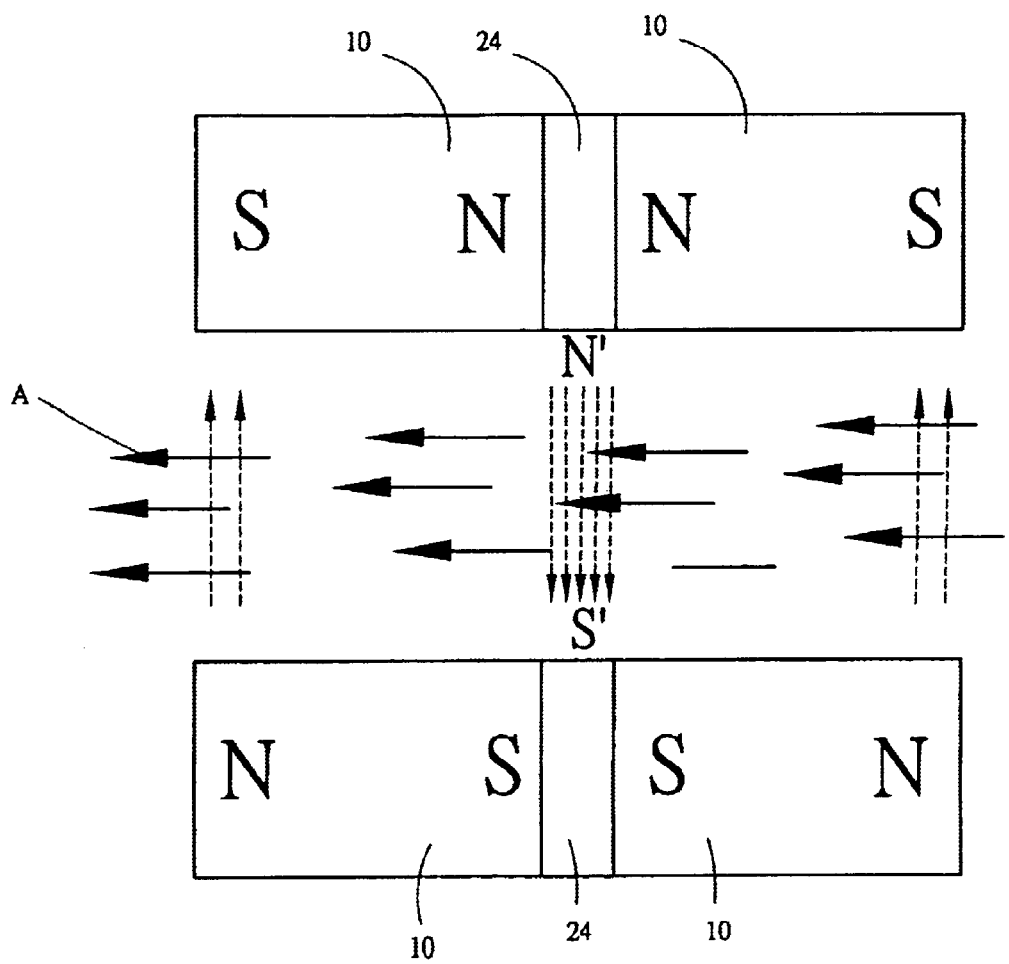
FIG. 12 shows the fifth embodiment in accordance with the invention.

Referring to FIG. 12, in order to gain an equal strength of the magnetic lines of forces at the route of the fluid thereof, a pad 24 having permeability is provided between two joining magnetic poles of the neighboring magnets 10. The pad 24 unifies and enhances the strengths of the magnetic poles thereof in advance to form the magnetic fluxes N' and S', so that the strengths of all magnetic lines of forces passing through the routes A and A' stay constant.

The magnets described above are made of permanent magnetic materials such as stronium iron, barium iron, boron iron, nickel aluminum, or other materials that can permanently magnetized.

Compared to conventional magnetizers in which magnetic lines of forces are only distributed near the walls of the pipelines thereof or distributed at the structures near the center thereof, the invention is capable of evenly distributing the magnetic lines of forces to penetrate through the center of the route of the fluid thereof, so that the entire fluid passing through a particular segment is efficiently magnetized.

Conclusive from the above, the invention adopts simple structures to elevate the magnetization efficiency of fluids. And while this invention has been particularly shown and described with references to preferred embodiments thereof, it will be understood by those skilled in the art that various changes and adaptions may be made therein without departing from the true spirit and scope of the invention as defined by the appended claims.

What is claimed is:

1. A fluid magnetizer for a fluid comprising:
    a) at least one magnet set having at least two magnets, each of the at least two magnets having an N-pole and an S-pole;
    b) at least one N-magnetic flux formed by abutting two N-poles; and
    c) at least one S-magnetic flux formed by abutting two S-poles, each of the at least one N-magnetic flux and the at least one S-magnetic flux being located on opposite sides of the fluid.

2. The fluid magnetizer according to claim 1, wherein the at least one magnet set includes a first and a second two magnet set, the first magnet set forming the at least one N-magnetic flux, the second magnet set forming the at least one S-magnetic flux, the first magnet set and the second magnet set being positioned on opposite sides of the fluid.

3. The fluid magnetizer according to claim 2, wherein the at least two magnets of the first and the second magnet sets are positioned to form an axial array relative to a flow route of the fluid.

4. The fluid magnetizer according to claim 2, wherein the at least two magnets of the first and the second magnet sets are positioned to form radial array relative to a flow route of the fluid.

5. The fluid magnetizer according to claim 1, wherein the at least two magnets have a C-shape, wherein the distance between the N-pole and the S-pole of each of the at least two magnets is smaller than diameters thereof.

6. The fluid magnetizer according to claim 1, wherein the at least one magnet set includes at least two concentric magnet sets, each of the at least two magnet sets includes at least two circular magnets, a first of the at least two magnet sets forming the at least one N-magnetic flux, a second of the at least two magnet sets forming the at least one S-magnetic flux, the at least two magnet sets being positioned on opposite sides of the fluid.

7. The fluid magnetizer according to claim 1, wherein each of the at least two magnets of the at least one magnet set has a cover layer.

8. The fluid magnetizer according to claim 1, wherein a permeable pad is positioned between each of the at least one N-magnetic flux and each of the at least one S-magnetic flux.

\* \* \* \* \*